United States Patent [19]

Breckner et al.

[11] Patent Number: 5,018,946

[45] Date of Patent: May 28, 1991

[54] FLUID PUMP APPARATUS

[75] Inventors: Raymond A. Breckner, Richmond; Kurt K. Henriksson, Vancouver; Leslie C. Sharratt, Richmond; Leslie M. Sharratt, Ganges, all of Canada

[73] Assignee: Innovac Technology Inc., Richmond, Canada

[21] Appl. No.: 494,114

[22] Filed: Mar. 14, 1990

[30] Foreign Application Priority Data

Mar. 14, 1989 [CA] Canada ................. 593611

[51] Int. Cl.⁵ ............................................. F04F 5/46
[52] U.S. Cl. ...................................... 417/197; 417/158; 417/198
[58] Field of Search ............... 417/151, 170, 197, 198, 417/158, 76

[56] References Cited

U.S. PATENT DOCUMENTS

| | | | |
|---|---|---|---|
| 2,444,615 | 7/1948 | Reinhardt | 417/170 |
| 2,620,967 | 12/1952 | Worn | 417/158 |
| 3,134,338 | 5/1964 | Dodge | 417/198 |
| 3,589,383 | 6/1971 | Garnier | 417/198 |
| 3,625,820 | 12/1971 | Gluntz | 417/198 |
| 3,815,487 | 6/1974 | Teodoresch et al. | 417/198 |
| 4,046,492 | 9/1977 | Inglis | 417/197 |
| 4,090,814 | 5/1978 | Teodoresch et al. | 417/158 |
| 4,519,423 | 5/1985 | Ho et al. | 417/198 |
| 4,776,731 | 10/1988 | Briggs et al. | 417/198 |

Primary Examiner—Leonard E. Smith
Assistant Examiner—Michael I. Kocharov
Attorney, Agent, or Firm—C. A. Rowley

[57] ABSTRACT

A liquid pump for conveying sensitive materials from a first to a second location through a main duct. The pump has a first segment through which secondary liquid flows with the materials. An inlet orifice receiving primary liquid from a plenum has a convex or Coanda surface and injects primary liquid into the main duct downstream of the first segment. The primary liquid intercepts the convex surface substantially tangentially and is turned through an angle to one more closely resembling the angle of the longitudinal axis of the pump. The first segment has a fustro-conical control surface which diverges outwardly immediately adjacent the outlet end of the first segment. The inside diameter of the outlet end of the first segment immediately before the control surface is substantially identical to the inside diameter of the second segment immediately downstream of the Coanda surface. Liquid directing vanes are positioned in the plenum just prior to the inlet orifice.

16 Claims, 3 Drawing Sheets

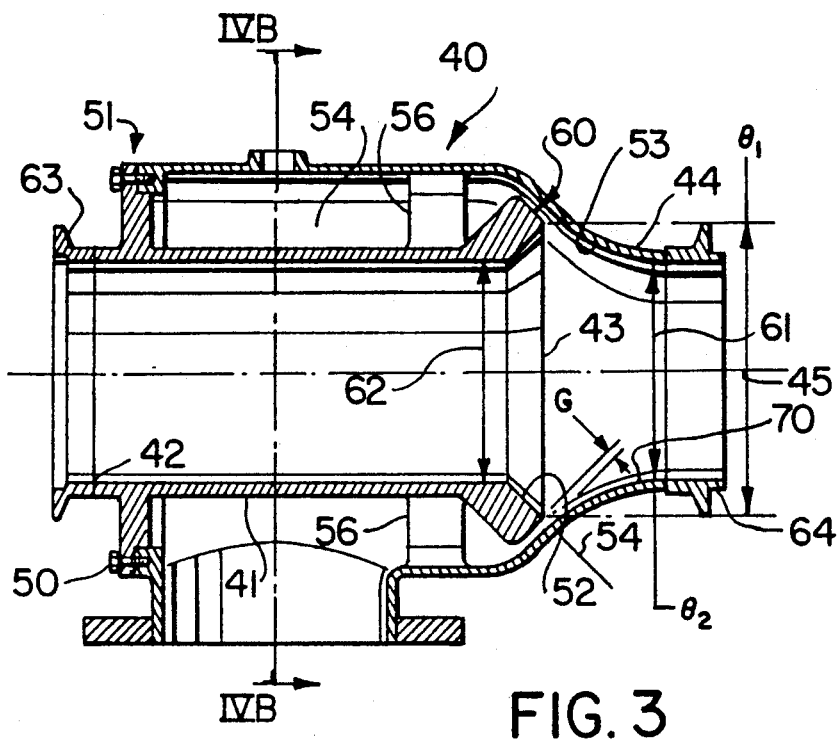
FIG. 3
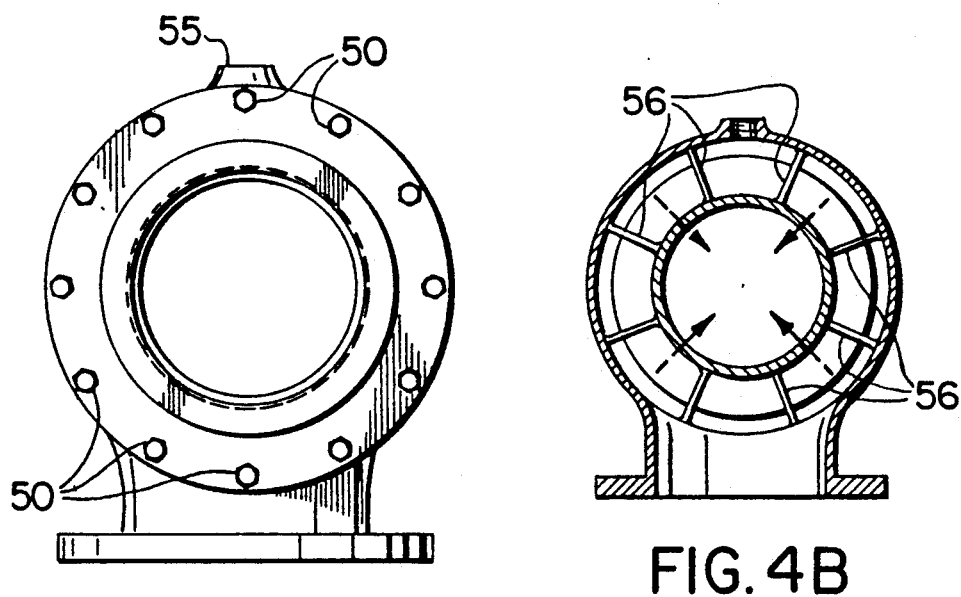
FIG. 4A
FIG. 4B

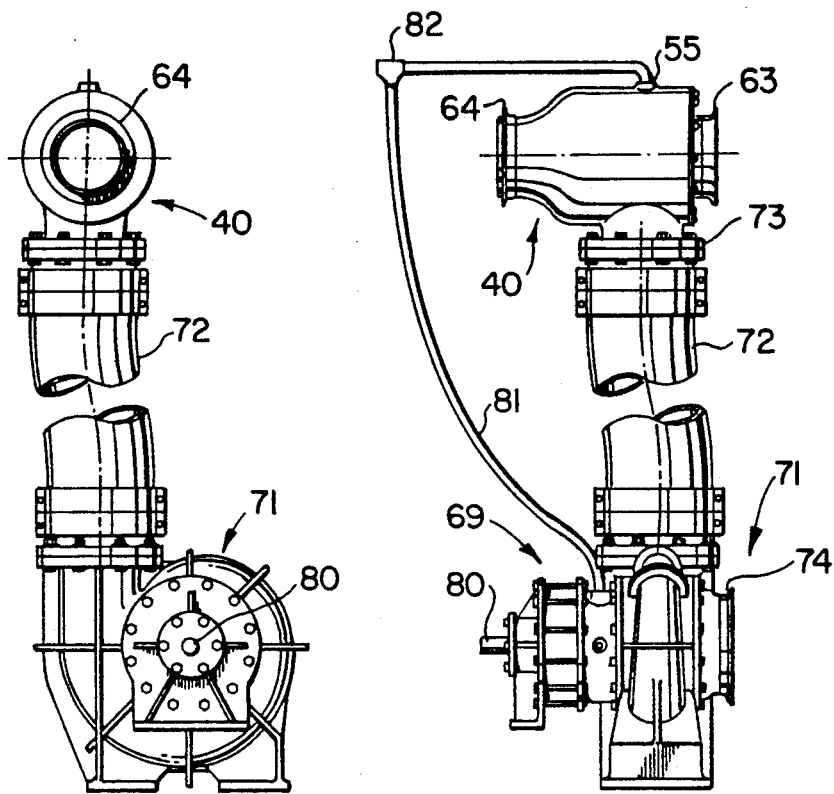
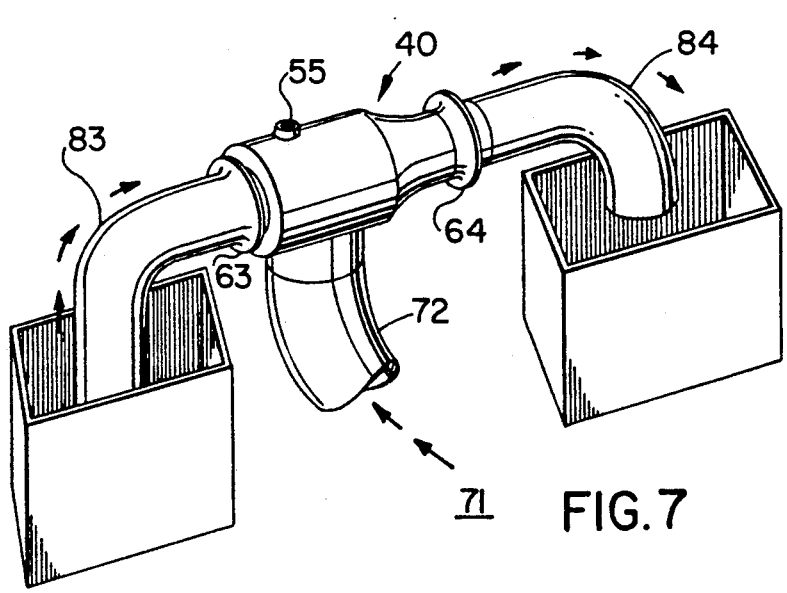

FLUID PUMP APPARATUS

INTRODUCTION

This invention relates to a liquid pump for conveying sensitive materials and, more particularly, to a control surface for a liquid pump having an inlet orifice for injecting primary liquid, the inlet orifice directing liquid to a Coanda or convex surface.

BACKGROUND OF THE INVENTION

In U.S. Pat. application Ser. No. 167,078, filed Mar. 11, 1988 and in continuation-in-part application Ser. No. 300,097, filed Jan. 19, 1989, there is disclosed a liquid pump used for conveying fish and other delicate commodities from a first to a second location. The pump there disclosed utilizes the "Coanda" or wall attachment effect to deflect primary liquid injected into a main duct which, if not deflected, otherwise could damage the commodities carried in the main duct by the secondary liquid. Such a pump has inherently greater efficiency due, it is believed, to not only the shear or particle collision effect between the primary liquid injected through the Coanda inlet and the secondary liquid carrying the commodities but also due to the suction effect created by the action of the primary liquid on the Coanda surface.

A further disclosure in the above-identified applications is a first segment upstream of the Coanda surface which diverges from its inlet end and which terminates at its outlet end immediately before the point of injection of the primary liquid from the Coanda orifice. The inside diameter of the outlet end of the first segment is larger than the inside diameter of the second segment downstream of and smoothly merging with the Coanda surface. Yet a further disclosure in the above-identified applications is a second segment which converges downstream from the Coanda orifice and, thereafter, diverges from the minimum inside diameter location.

The apparatus there disclosed, while found useful in some applications, was found unsatisfactory in other respects. Primarily, it was found that fish damage could occur as set out in greater detail hereafter and that the pumping efficiency of the pump was unnecessarily impaired.

The applicant believes the following explanations for the unsatisfactory operation of the liquid pump referred to above are correct. However, such explanations are given in the interests of full disclosure and subsequent events may result in different or amended explanations. Applicant, therefore, would not wish to be bound by the present explanations if they are found to be incorrect or not applicable in the future.

In prior apparatus as disclosed in the aforementioned applications, the first segment diverged smoothly from its inlet end to the outlet end located adjacent the primary liquid injection point through the orifice. The Coanda surface converged to a first inside diameter which was located downstream from the first segment. The inside diameter downstream from the first segment was smaller than the inside diameter of the outlet end of the first segment. For that reason, fishes travelling from the first segment would impact with the converging Coanda surface, thereby causing fish damage or fish kill.

A further problem in the aforementioned applications was in the area of the Coanda orifice where there is a low pressure or "suction" zone created by the primary liquid injection which impairs momentum to the secondary liquid flow and which results in an inherent improvement in efficiency over previous injection type pumps. However, since the first segment diverged, at the point of primary fluid injection there was a reduced velocity in the first segment due to the increased cross section. This reduced velocity and increased area allowed the secondary fluid to be pulled through the second segment by the Coanda effect around the perimeter of the second segment only and an undesirable no flow or reverse flow condition was allowed to exist in the center or core of the second segment. Under some conditions, the core effect would extend into the inlet end of the first section. When such core effect took place, the no flow or reverse flow core would be able to reverse and re-enter the second segment around the perimeter of the second segment due to the Coanda effect. This would satisfy the low pressure area created by the primary fluid injection over the Coanda surface. The result of allowing this core effect to take place was, therefore, a loss of secondary fluid flow and unacceptable turbulence in the area of primary injection.

Yet a further problem with the prior pump was created by the divergence of the second segment from the minimum throat diameter at the Coanda surface to the downstream end of the second segment. This divergence created a larger cross section in the second segment downstream of the Coanda surface and would not permit the effective transfer of the primary fluid momentum throughout the entire cross section of the second segment. This allowed a core of unaffected secondary fluid to exist in the center of the second segment and, under extreme conditions, to extend upstream into the first segment. Such a core resulted in unnecessary turbulence and loss of efficiency.

Yet a further problem with the prior pump related to the width of the Coanda orifice through which the primary liquid flowed. It was determined that if the width of the orifice was too narrow, not enough momentum would be transferred to the secondary liquid because the injected liquid would dissipate too easily into the secondary flow. This resulted in the backpressure allowing a core effect to occur. The core effect was water in the central core of the second segment which, literally, had little or no movement or had even reverse movement thus preventing the pumping and movement of fish.

Yet a further problem with the previous pump related to the liquid injection through the Coanda orifice from the plenum which contained the primary liquid used for injection through the orifice. As the distance from the bottom of the pump increased, the primary liquid would not flow directly radially inwardly after leaving the peripheral injection orifice but, rather, would curve downwardly when viewed from the end. This decreased the Coanda effect and, hence, the efficiency of the pump.

SUMMARY OF THE INVENTION

According to one aspect of the invention, there is disclosed a liquid pump comprising a main duct having an inlet, an outlet and a longitudinal axis, said main duct including a first segment having an inlet end and an outlet end, said first segment being operable to be coupled to a source of liquid to be moved from a first location to a second location, means associated with said first segment for forming an annular orifice for directing a primary liquid into said main duct at a location downstream of said outlet end of said first segment, and an annular Coanda surface positioned to intercept liquid issuing from said orifice substantially tangential to said surface, said outlet end of said first segment terminating in an annular control surface extending outwardly from said longitudinal axis.

According to a further aspect of the invention, there is disclosed a liquid pump for conveying sensitive material from a first to a second location, said pump comprising a main duct including a first segment having an inlet end and an outlet end, said first segment being operable to be coupled to a source of liquid to be moved from a first segment for forming an annular orifice for directing a primary liquid into said main duct at a location downstream of said inlet, a second segment having an annular Coanda surface located downstream of said orifice, said Coanda surface being positioned to intercept liquid issuing from said orifice substantially tangential to said surface, and converging smoothly to an inside diameter having a dimension substantially identical to the inside diameter of said outlet end of said first segment.

According to a further aspect of the invention, there is disclosed a liquid pump comprising a main duct having an inlet, an outlet and a longitudinal axis, said main duct including a first segment having an inlet end and an outlet end, said first segment being operable to be coupled to a source of liquid to be moved from a first location to a second location and means associated with said first segment for forming an annular orifice having a predetermined width for directing a primary liquid into said main duct at a location downstream of said inlet.

According to yet a further aspect of the invention, there is disclosed a liquid pump comprising a main duct having an inlet, an outlet and a longitudinal axis, said main duct including a first segment having an inlet end and an outlet end, said first segment being operable to be coupled to a source of liquid to be moved from a first to a second location, means associated with said first segment for forming an annular orifice for directing a primary liquid into said main duct at a location downstream of said inlet, an annular Coanda surface being positioned to intercept liquid issuing from said orifice substantially tangential to said surface, a plenum formed in association with and upstream o said Coanda orifice to provide liquid to said orifice and a plurality of liquid directing vanes mounted in said plenum before said orifice, said vanes acting to direct said liquid in said plenum to said orifice in a predetermined direction.

BRIEF DESCRIPTION OF THE SEVERAL VIEWS OF THE DRAWINGS

A specific embodiment of the invention will now be described, by way of example only, with the use of drawings in which:

FIG. 3 is a partial side sectional view of a liquid pump illustrating several of the features according to the invention;

FIG. 4A is an end view of the apparatus of FIG. 3;

FIG. 4B is a sectional end view taken along IVB—IVB of FIG. 4A;

FIG. 5 is a diagrammatic side view of the apparatus according to the invention with a liquid ring vacuum and centrifugal pump attached;

FIG. 6 is an end view of the apparatus of FIG. 4; and

FIG. 7 is a partial diagrammatic isometric view of a typical operating configuration of the apparatus according to the invention.

DESCRIPTION OF SPECIFIC EMBODIMENT

Figure 1:
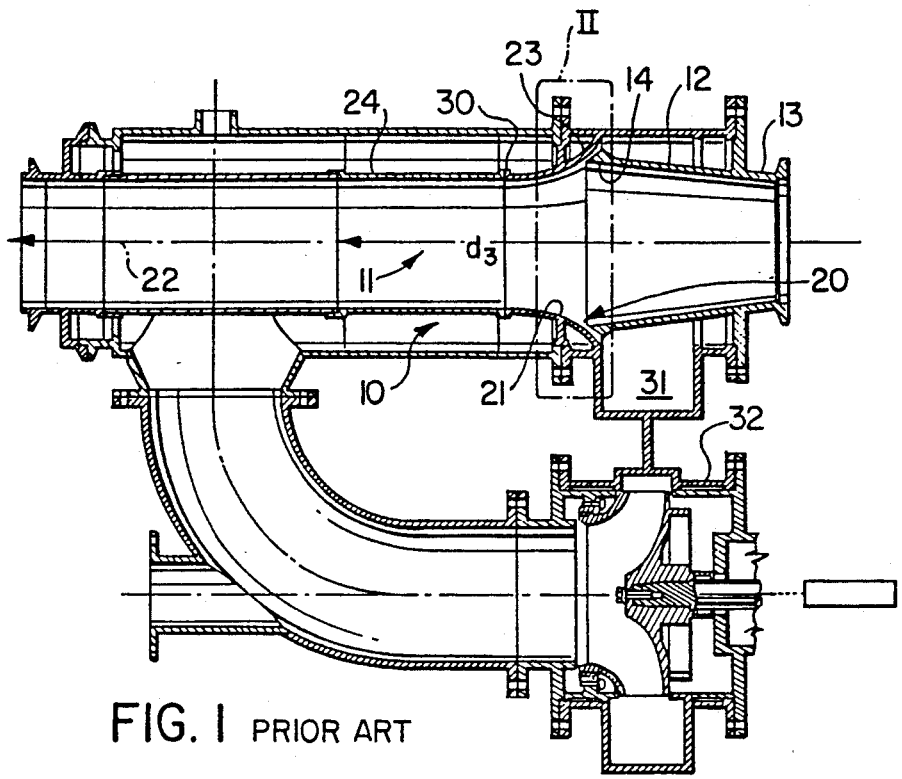
FIG. 1 is a side sectional view of the pump used prior to the present invention.

Reference is now made to the drawings and, in particular, to FIG. 1 which illustrates a liquid pump generally illustrated at 10. It includes a main duct generally illustrated at 11 which has a longitudinal axis 22 and through which flows secondary liquid carrying sensitive commodities such as live fish. The main duct includes a first segment 12 which is fustro-conical in configuration and diverges from its inlet end 13 to its outlet end 14.

An annular orifice generally illustrated at 20 is positioned about the periphery of the outlet end 14 of the first segment 12. The annular orifice 20 includes a convex curved surface 21 on a second segment 23. The surface 21 extends annularly about the periphery of the inside of the second segment 23 and acts to intercept primary liquid injected into the main duct 11 through the orifice 20. The convex surface 21 is also knows as a Coanda surface for the effect which it creates on the primary liquid issuing through the orifice 20. When the primary liquid strikes the surface 21 nearly tangentially, it remains attached to the surface 21 for a period of time which therefore changes the angle of the primary liquid which strikes the surface 21 to an angle which more closely resembles that of the longitudinal axis 22 of the liquid pump 10.

A third segment 24 is connected to the second segment 23 at a flanged connection 30 and extends downstream therefrom.

Figure 2:
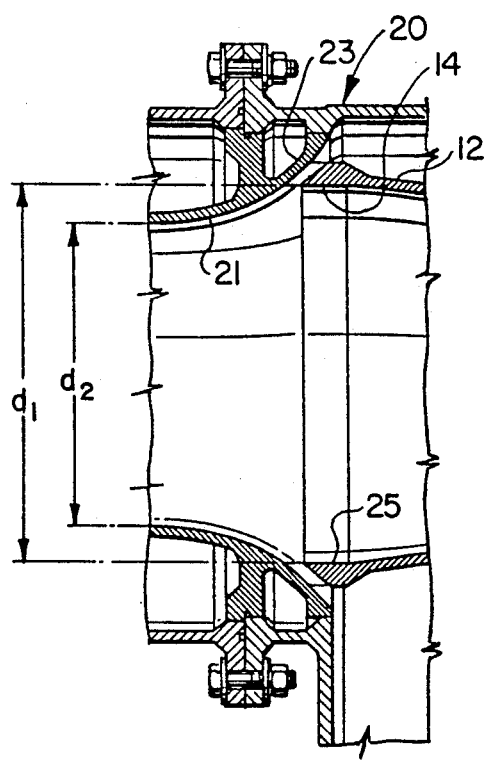
FIG. 2 is an enlarged sectional partial view of the area II of FIG. 1.

Referring more particularly to FIG. 2, several characteristics of the apparatus previously utilized will be pointed out. First, the convex surface 21 on the second segment 23 converges smoothly to the smallest inside diameter of the second segment 23 which is indicated as $d_2$ and which is substantially identical with the inside diameter $d_3$ of the third segment 24 (FIG. 1). Diameters $d_2$ and $d_3$ are less than the inside diameter $d_1$ of the outlet end 14 of the first segment 12 which diverges as it approaches the annular orifice 20. Secondly, it will be noted that the outlet end 14 of the first segment 12 does not abruptly change its outlet angle; that is, the inside surface f the first segment 13 diverges quite smoothly throughout its length from the inlet end 13 to the outlet end 14 where its outlet end 14 terminates in a surface 25 having a substantially uniform diameter. Thirdly, it will be noted that the plenum 31 which provides primary liquid to the orifice 20 does not contain vanes to direct the primary liquid in a particular direction prior to the liquid being ejected from the orifice 20.

In operation, the liquid pump 10 of FIG. 1 utilizes a centrifugal pump 32 which supplies primary liquid to the plenum 31 of the pump 10. The primary liquid issues through the orifice 20 from the plenum 31 and supplies a region of reduced pressure or suction adjacent to the convex surface 21 which thereby imparts momentum to the flow of secondary liquid in the main duct 11 which is filled with sensitive commodities such as live fish.

Reference is now made to FIG. 3 where a liquid pump according to the invention is generally illustrated at 40. It comprises a first segment 41 having a generally uniform inside diameter 62 (or may taper slightly) from its inlet end 42 to a position immediately before its outlet end 43 and a second segment 44 which is connected to the first segment 41 by a plurality of stud-nut connections 50 which secure a flanged connection generally illustrated at 51.

The first segment 41 has an annular fustro-conical control surface 52 extending about its inside periphery immediately adjacent the outlet end 43. The surface 52 extends outwardly from the longitudinal axis 45 of the pump 40 and an extension 54 of the control surface 52 intercepts the convex or Coanda surface 53 of the second segment 44 at right angles to the tangent of the radius of convex surface 53 at the projected point of intersection or generally normal to the surface 53 as is indicated.

Second segment 44 forms a plenum 54 with first segment 41, the plenum 54 communicating with the primary liquid orifice generally illustrated at 60. A plurality of liquid directing vanes or fins 56 to create substantially uniform velocity of the primary liquid prior to the water entering the orifice 60 and to direct the primary liquid substantially parallel to the longitudinal axis 45 of the pump 40 extend between the outside of the first segment 41 and the inside of the second segment 44 within the plenum 54. Eight (8) such vanes 56 are positioned in the plenum 54 as seen in FIG. 4B.

The orifice 60 includes a convex or Coanda surface 53 similar to the surface 21 of the FIG. 1 embodiment. However, whereas the surface 21 of the FIG. 1 embodiment smoothly converges to an inside diameter $d_2$ which is smaller than the inside diameter $d_1$ of the outlet end 14 of the first segment 12 as illustrated in FIG. 1, the surface 53 of the FIG. 3 smoothly converges to an inside diameter 61 which is very close or identical to the value of the inside diameter 62 of the outlet end 43 of the first segment 42 immediately before the commencement of the control surface 52 as illustrated in FIG. 3. A suction port 55 (FIG. 4A) is provided on the top of the plenum 54 in the second segment 44 to allow for initiating the operation of the pump 40 as will be described hereafter.

Flanged connections 53, 64 are connected to the inlet end 42 of the first segment 41 and to the outlet end 70 of the second segment 44, respectively. The flanged connections 53, 64 operate to allow inlet and outlet hoses 83, 84, respectively (FIG. 7), to be attached.

With reference now to FIGS. 5 and 6, a combination liquid ring vacuum and centrifugal pump generally illustrated at 69, 71, respectively, both operating on the same shaft 80 for compact operation, is connected to the liquid pump 40 by way of a hose 72 connected to flange 73 and provides the primary liquid required to fill the plenum 54 and to issue from the orifice 60 with the necessary pressure to impart momentum to the secondary flow moving within the first segment 41. A flanged connection 74 allows for a hose (not illustrated) to be attached to the centrifugal pump 71 so to provide a source of primary liquid to the centrifugal pump 71. A source of power (not illustrated) such as an engine or motor is connected to shaft 80 which rotates the pump 71 as required to produce the necessary volume and pressure of water.

A vacuum line 81 extends from the liquid ring vacuum pump 69 to a three way valve 82 and thence to suction port 55. The three way valve 82 may direct the suction created by liquid ring vacuum pump 69 to the suction port 55 or pump 40 or to atmosphere as indicated.

OPERATION

In operation and with reference to FIG. 7, a hose 82 is connected to flange 63 and the distant end of the hose 83 is positioned in a source which may be, of course, water in which live fish are swimming. A second hose 84 is connected to flange 64 and the distant end of the second hose 84 is placed at the destination location desired for the live fish.

The three way valve 82 (FIG. 5) then is positioned to allow evacuation of air through the suction port 55 from the plenum 54, hoses 83, 84 (FIG. 7) and centrifugal pump 71. A check valve (not shown) will be part of the outlet hose 84 which is connected to the flange 64 and will ordinarily be closed in the no-flow condition. The operation of the centrifugal pump 71 then fills the plenum 54 with liquid as the vacuum evacuates the ambient air from the plenum 54. The primary liquid is ejected from Coanda orifice 60 and pumping action of the second liquid through the pump 40 has then commenced. The three way valve 82 is rotated such that the vacuum line 81 is open to the atmosphere and the suction port 55 is closed.

The primary liquid supplied by pump 71 to plenum 54 (FIG. 3) will be directed through vanes 56 prior to entering the orifice 60. The vanes will straighten the flow such that the flow of primary liquid will be directed substantially radially through the orifice 60 in the direction indicated by the arrows in FIG. 4B. The flow through orifice 60 will contact surface 53 substantially tangential thereto. The primary liquid will be turned through an angle by the Coanda surface 53 to an angle more closely resembling the longitudinal axis 45 of the pump 40 and will travel into the secondary liquid in the main duct being carried by pump 40 at a velocity higher than the velocity of the secondary liquid.

This action will cause both a suction force due to the Coanda surface and a momentum transfer from the primary liquid to the secondary liquid thereby causing the live fish and water to be directed upwardly from the source, through the inlet hose 83 connected to the flanged inlet connection 63, through the pump 40 and out outlet hose 84 to the destination.

The fish will flow smoothly through the first segment 41 of pump 40 at a uniform velocity and they will pass quickly through the transition zone in the vicinity of the orifice 60 because of the abrupt angular departure of control surface 52. While is it now known precisely why the fish are not adversely effected by the transition zone, it is believed that the quick transition of the control surface 52 and the uniform velocity of the fish in the first segment 42 combine to prevent reaction by the fish before they are subsequently influenced by the powerful flow of the combined primary and secondary liquids downstream of the orifice 60 in the second segment 44.

Likewise, since the inside diameter 62 (FIG. 3) of the first segment 41 is substantially identical to the inside diameter 61 of the outlet end 70 of the second segment 44, the fish are not subject to entering a cylinder with a reduced diameter where impact might occur.

It is desirable to keep the length of the control surface 52 small to create a small zone for the fish to pass and, as described, the 90 degree angle created between the control surface 52 and the convex surface 53 allows an efficient suction effect to occur on the secondary liquid in the first segment 41. However, it is contemplated that other angle could possibly be utilized without entirely losing the benefits of the invention.

A width "G" (FIG. 3) for the orifice 60 of from 0.385 to 0.400 inch has been found satisfactory when used with the pump 40 having an inside diameter of about eight (8) inches and a ten (10) foot head. Such a width will cause good shear and suction transfer between the primary and secondary liquids. In addition, the width "G" allows potentially clogging particles to pass through the orifice 60. The gap "G" can range between 0.375 and 0.400 inches but it has been found that a small gap "G" of only about 0.200 inch with the pump 40 having the characteristics described will allow the core effect or increased backpressure of water in the first segment 41 and downstream which can severely reduce the efficiency and pumping action. In the case of the pump 40 having these characteristics, a pressure in the plenum 54 of approximately 12 p.s.i. immediately upstream of the orifice 60 is obtained but the pressure required will be reduced as the head is reduced. With this pressure, the secondary liquid is moving through the first segment 41 at a speed of approximately 5 fps. A radius of the convex surface 53 in the present embodiment of 6 inches has been found satisfactory to obtain the necessary momentum transfer to and suction on the secondary liquid. A ratio of $\theta_1/\theta_2$ or the ratio of the diameter of the outlet end 43 of the first segment 41 to the inside diameter 61 of the second segment 44 of 1–1.3 has also been found satisfactory to allow for good suction effect between the Coanda surface 53 and the secondary flow in the first segment 41.

The inside diameters of the first and second segments 41, 44, respectively are, of course, variable depending on the type of fish to be conveyed. For normal use, however, in transferring fish having individual weights of from 1-10 lbs., such as salmon, an eight (8) inch diameter has been found satisfactory. For smaller fish, a four (4) inch diameter pipe could be used and for fish over 20 lbs., a twelve (12) inch diameter pump is presently contemplated to operate satisfactory.

The power requirements for the liquid ring vacuum and centrifugal pump 69, 71 will be determined by the required head the fish are intended to be moved. For a height of ten (10) feet using the pump configuration earlier set out, a motor having twenty-three (23) horsepower has been used satisfactorily. Such a motor connected to the centrifugal pump 71 will produce a flow rate of primary liquid through the pump 40 which, in turn, will suffice to create a flow rate of secondary liquid through the pump 40 in the second segment 44 at a rate of approximately 10 fps.

There are other applications to which the liquid pump 40 according to the present invention can be used. Although it has been used for conveying live fish, other sensitive commodities such as food stuffs are also contemplated to be satisfactorily conveyed without damage.

Likewise, while the liquid ring vacuum and centrifugal pump 69, 71, respectively, are illustrated as being connected to liquid pump 40 by hose 72, they could also be directed coupled, if desirable, without a hose 72 being present.

Similarly, while the vanes 56 have been referred to as liquid directing vanes and are shown to be parallel to the longitudinal axis 45 of pump 40 in FIGS. 3 and 4B in order to give the primary fluid a direction parallel to the longitudinal axis 45 of the pump 40, it is also contemplated that, if desired, for certain applications, the vanes 56 may be positioned to give the primary liquid a spiral or vortex-type flow through the orifice 60 and into the secondary flow.

An inside diameter 62 of the first segment 41 of eight (8) inches has been found satisfactory for conveying fish in most applications. However, it is contemplated that an inside diameter ranging from four (4) to twelve (12) inches could also be used successfully for other applications.

Many further modifications to the invention will readily occur to those skilled in the art to which the invention relates and the specific embodiments described are intended to be illustrative of the invention only and not as limiting its scope which should be construed in accordance with the accompanying claims.

What is claimed is:

1. A liquid pump for conveying sensitive material from a first to second location, said pump comprising a main duct extending along a longitudinal axis, said main duct including a first segment having an inlet end and an outlet end, said first segment being operable to be coupled to a source of liquid to be moved from a first location to a second location, means coupled with said first segment for forming an annular orifice for directing a primary liquid into said main duct at a location downstream of said inlet, said second segment having an annular convey curved surface located downstream of said orifice, said annular convex curved surface being positioned to intercept said liquid issuing from said orifice substantially tangential to said annular convex curved surface whereby said annular convex curbed surface may generate a Coanda effect in said primary fluid as it passes thereover, said annular curved surface converging smoothly to an inside diameter having a dimension substantially identical to the inside diameter of said outlet end of said first segment, a frusta-conical control surface extending peripheral around said first segment at said outlet end of said first segment and expanding outward at an angle to said longitudinal axis toward said annular curved surface, and wherein said inside diameter of said outlet end is measured on the inlet end side of and immediately adjacent to said control surface.

2. A liquid pump as in claim 1 wherein said fustro-conical control surface extends peripherally around the inside of said outlet end of said first segment normal to said Coanda surface.

3. A liquid pump as in claim 2 wherein said inside diameters of each of said first and second segments are uniform and substantially identical.

4. A liquid pump as defined in claim 1 further comprising pump means for pumping said liquid through said orifice.

5. A liquid pump comprising a main duct having an inlet and an outlet and a longitudinal axis, said main duct including a first segment and a second segment co-axial with said longitudinal axis, said first segment having an inlet end and an outlet end, said first segment being operable to be coupled to a source of liquid to be moved from a first location to a second location, means associated with said first segment for forming an annular orifice for directing primary liquid into said main duct at a location downstream of said outlet end of said first segment, an annular convex curved surface positioned to intercept liquid issuing from said orifice toward said second section and substantially tangential to said annular convex curved surface thereby to generate a Coanda effect in said primary fluid as it passes thereover, said surface merging smoothly with the inner periphery of said second segment, said outlet end of said first segment terminating in an annular frusta-conical control surface extending peripherally around the end of said first segment outwardly from said longitudinal axis at an angle to said longitudinal axis of said main duct so that an extension of said annular control surface intersects substantially normally with said annular curved surface, the inside perimeter of said first segment immediately before the commencement of said control surface being substantially equal to an inside perimeter of said second segment immediately downstream of said annular curved surface.

6. A liquid pump s in claim 5 wherein the inside periphery of said first segment is uniform from the inlet end to the commencement of said control surface.

7. A liquid pump as in claim 6 wherein said inside periphery of said first segment and said second segment are substantially circular.

8. A liquid pump as in claim 7 wherein the ratio of the inside diameter of said first segment at the outlet end of said control surface to the inside diameter of said segment immediately downstream of said Coanda surface is approximately 1-1.3.

9. A liquid pump as in claim 8 wherein the inside diameter of said second segment is substantially uniform throughout the length of said second segment downstream of said Coanda surface.

10. A liquid pump as defined in claim 7 further comprising pump means for pumping said primary fluid through said orifice.

11. A liquid pump as defined in claim 5 further comprising pump means for pumping said primary liquid through said orifice.

12. A liquid pump (40) for pumping a slurry containing sensitive material, said pump (40) having a main duct (11) extending along a longitudinal axis including a first portion (41) having an inlet end (42) and an outlet end (43) and a second portion (44) having an annular convex curved surface (53) circling said main duct (11) at the end of said second section (44) adjacent said first section (41), said convex curved surface (53) converging smoothly in the direction of flow through said main duct (11) into said second portion (44) of said main duct (11), means forming an annular orifice (60) encircling said main duct between said outlet end (43) of said first section (41) and said convex curved surface (53), said orifice (60) is aimed to direct flow of a primary fluid from said orifice substantially tangentially along said convex curved surface (53), an expanding control surface (52) formed at the outlet end (43) of said first segment (41) expanding outward from said first portion (41) extending along a longitudinal axis of said main duct (11) to said orifice (60) and defining one edge of said orifice (60), said first portion (41) of said main duct (11) having a substantially uniform cross section (62) area measured perpendicular to a longitudinal axis (45) of said main duct (11) between said inlet end (42) and said control surface (52), said second portion (44) of said main duct (11) having a cross section (61) measured perpendicular to said longitudinal axis (45) of said main duct (11) substantially the same as said cross section (62) of said first portion (41) of said duct (11), said control surface (52) defining the periphery of said main duct (11) between said first portion (41) and said orifice (60) and said convex curved surface (53) defining the periphery of said main duct (11) between said orifice (60) and said second portion (44) of said main duct (11).

13. A liquid pump (40) as defined in claim 12 wherein said cross sections (62 and 61) are substantially right cylindrical and wherein said annular control surface (52) is substantially frusta-conical.

14. A liquid pump (40) as defined in claim 13 wherein an extension (54) of said control surface (52) intersects and convex curved surface (53) substantially normal to said convex curved surface (53).

15. A liquid pump (40) as defined in claim 4 wherein the ratio of the inside diameter (62) of said first portion (41) of said main duct (11) and the diameter of said edge of said orifice (60) defined by said control surface (52) is approximately 1 to 1.3.

16. A liquid pump (40) as defined in claim 5 further comprising vane means (56) in a passage (54) for said primary fluid leading to said orifice (60), said vein means (56) directing flow of said primary fluid through said orifice (60) substantially axially of main duct (11) toward said second portion (44).

* * * * *